US011313258B2

(12) United States Patent
Son et al.

(10) Patent No.: US 11,313,258 B2
(45) Date of Patent: *Apr. 26, 2022

(54) CONTINUOUS VARIABLE VALVE DURATION APPARATUS AND ENGINE PROVIDED WITH THE SAME

(71) Applicants: Hyundai Motor Company, Seoul (KR); Kia Motors Corporation, Seoul (KR)

(72) Inventors: You Sang Son, Suwon-si (KR); In Sang Ryu, Yongin-si (KR); Kyoung-Pyo Ha, Seongnam-si (KR); Dongheon Park, Seongnam-si (KR); Back Sik Kim, Osan-si (KR); Seung Jae Lee, Bucheon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 81 days.

This patent is subject to a terminal disclaimer.

(21) Appl. No.: 16/909,338

(22) Filed: Jun. 23, 2020

(65) Prior Publication Data
US 2021/0062691 A1 Mar. 4, 2021

(30) Foreign Application Priority Data

Sep. 3, 2019 (KR) .......................... 10-2019-0108713
May 21, 2020 (KR) .......................... 10-2020-0060794

(51) Int. Cl.
| *F01L 1/34* | (2006.01) |
| *F01L 13/00* | (2006.01) |
| *F01L 1/047* | (2006.01) |
| *F16H 1/16* | (2006.01) |
| *F16H 53/04* | (2006.01) |
| *F01M 9/10* | (2006.01) |

(52) U.S. Cl.
CPC .......... *F01L 13/0015* (2013.01); *F01L 1/047* (2013.01); *F01M 9/101* (2013.01); *F16H 1/16* (2013.01); *F16H 53/04* (2013.01); *F01L 2305/00* (2020.05)

(58) Field of Classification Search
CPC ... F01L 13/0015; F01L 1/047; F01L 2305/00; F16H 1/16; F16H 53/04; F16H 55/24; F01M 9/101
See application file for complete search history.

(56) References Cited

U.S. PATENT DOCUMENTS

2006/0005796 A1* 1/2006 Janak ...................... F01L 13/06
123/90.16

* cited by examiner

*Primary Examiner* — Zelalem Eshete
(74) *Attorney, Agent, or Firm* — Slater Matsil, LLP

(57) ABSTRACT

A continuous variable valve duration apparatus includes a cam unit, a cam formed on the cam unit, a camshaft inserted into the cam, a guide bracket, a guide shaft mounted on the guide bracket and disposed perpendicular to the camshaft, wherein a guide screw thread is formed on the guide shaft, a wheel housing disposed within the guide bracket, an inner wheel rotatably inserted into the wheel housing and movable perpendicular to the camshaft, a worm wheel disposed within the wheel housing, wherein an inner screw thread configured to engage with the guide screw thread is formed inside the worm wheel and an outer screw thread is formed on the worm wheel, a control shaft, a control worm formed on the control shaft, and a wheel elastic portion mounted to the wheel housing.

20 Claims, 24 Drawing Sheets

CONTINUOUS VARIABLE VALVE DURATION APPARATUS AND ENGINE PROVIDED WITH THE SAME

CROSS-REFERENCE TO RELATED APPLICATIONS

This application claims priority to Korean Patent Application No. 10-2019-0108713, filed in the Korean Intellectual Property Office on Sep. 3, 2019 and Korean Patent Application No. 10-2020-0060794, filed in the Korean Intellectual Property Office on May 21, 2020, which applications are hereby incorporated herein by reference.

TECHNICAL FIELD

The present invention relates to a continuous variable valve duration apparatus and an engine provided with the same.

BACKGROUND

An internal combustion engine generates power by combusting fuel in a combustion chamber in an air media drawn into the chamber. Intake valves are operated by a camshaft in order to intake the air, and the air is drawn into the combustion chamber while the intake valves are open. Furthermore, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. In order to achieve such optimal valve operation depending on the rotation speed of the engine, various research, such as designing of a plurality of cams and a continuous variable valve lift (CVVL) that can change valve lift according to engine speed, has been undertaken.

Also, to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

The above information disclosed in this Background section is only for enhancement of understanding of the background of the invention, and therefore it may contain information that does not form the prior art that is already known to a person of ordinary skill in the art.

SUMMARY

The present invention relates to a continuous variable valve duration apparatus and an engine provided with the same. Particular embodiments relate to a continuous variable valve duration apparatus and an engine provided with the same which may vary opening duration of a valve according to operation conditions of an engine with a simple construction.

Various embodiments of the present invention provide a continuous variable valve duration apparatus and an engine provided with the same which may vary opening duration of a valve according to operation conditions of an engine and reduce noise and vibration.

In one embodiment of the present disclosure a continuous variable valve duration apparatus may include a camshaft, a cam unit on which a cam is formed, the camshaft being inserted into the cam, a guide shaft on which a guide screw thread is formed and disposed perpendicular to the camshaft, a guide bracket on which the guide shaft is mounted, an inner wheel configured to transmit rotation of the camshaft to the cam unit, a wheel housing into which the inner wheel is rotatably inserted and movable perpendicular to the camshaft, the wheel housing being disposed within the guide bracket, a worm wheel to which an inner screw thread configured to engage with the guide screw thread is formed therewithin, and to which an outer screw thread is formed thereon, the worm wheel being disposed within the wheel housing, a control shaft on which a control worm configured to engage with the outer screw thread is formed, and a wheel elastic portion mounted to the wheel housing to push the worm wheel toward the guide shaft and the control shaft.

The wheel elastic portion may include a flat spring.

The wheel elastic portion may further include a flat spring guide mounted to the wheel housing to connect with the flat spring.

The flat spring guide may include guide coupling portions in contact with the wheel housing and a guide connecting portion formed between the guide coupling portions and forming a gap between the flat spring guide and the flat spring.

An insertion hole into which the guide shaft is inserted and a moving space within which the wheel housing is movable may be formed in the guide bracket.

The continuous variable valve duration apparatus may further include two guide walls protruded from the wheel housing, and a moving hole formed in each of the two guide walls and the guide shaft configured to be inserted into the moving holes.

The worm wheel may be disposed between the guide walls and configured to selectively push one of the two guide walls to move the wheel housing.

The continuous variable valve duration apparatus may further include a sliding shaft fixed to the guide bracket configured to guide movement of the wheel housing, and a sliding hole formed in the wheel housing, and the sliding shaft configured to be inserted into the wheel housing.

The continuous variable valve duration apparatus may further include a worm shaft cap fixed to the guide bracket configured to support the control shaft.

The continuous variable valve duration apparatus may further include a first sliding hole and a second sliding hole respectively formed in the inner wheel, a cam slot formed in the cam unit, a roller wheel connected to the camshaft and rotatably inserted into the first sliding hole, and a roller cam slidably inserted into the cam slot and rotatably inserted into the second sliding hole.

The roller cam may include a roller cam body slidably inserted into the cam slot, a cam head rotatably inserted into the second sliding hole, and a protrusion configured to inhibit the roller cam from being removed.

The roller wheel may include a wheel body slidably connected to the camshaft, and a wheel head rotatably inserted into the first sliding hole.

The continuous variable valve duration apparatus may further include a camshaft oil hole formed within the camshaft along a longitudinal direction thereof, a body oil hole formed in the wheel body of the roller wheel and configured to communicate with the camshaft oil hole, and an oil groove formed in the wheel head of the roller wheel and configured to communicate with the body oil hole.

The cam unit may include a first cam portion and a second cam portion which are disposed corresponding to a cylinder and an adjacent cylinder respectively, and the inner wheel may include a first inner wheel and a second inner wheel configured to transmit the rotation of the camshaft to the first cam portion and the second cam portion respectively.

The first inner wheel and the second inner wheel may be connected rotatable to each other.

The continuous variable valve duration apparatus may further include a bearing disposed within the wheel housing and configured to support the first inner wheel and the second inner wheel.

The continuous variable valve duration apparatus may further include two cams formed in the first cam portion and the second cam portion respectively, a cam connecting portion formed between the two cams, and a cam cap on which a cam supporting portion configured to support the cam connecting portion is formed.

An engine according to an exemplary embodiment of the present invention may be provided with the continuous variable valve duration apparatus.

As described above, a continuous variable valve duration apparatus according to an exemplary embodiment of the present invention may vary an opening duration of a valve according to operation conditions of an engine, with a simple construction.

The continuous variable valve duration apparatus according to an exemplary embodiment of the present invention may be reduced in size and thus the entire height of a valve train may be reduced.

Since the continuous variable valve duration apparatus may be applied to an existing engine without excessive modification, productivity may be enhanced and production cost may be reduced.

The continuous variable valve duration apparatus according to an exemplary embodiment of the present invention can reduce noise and vibration by applying a wheel elastic portion even if there is a production error in the parts.

Figure 1:
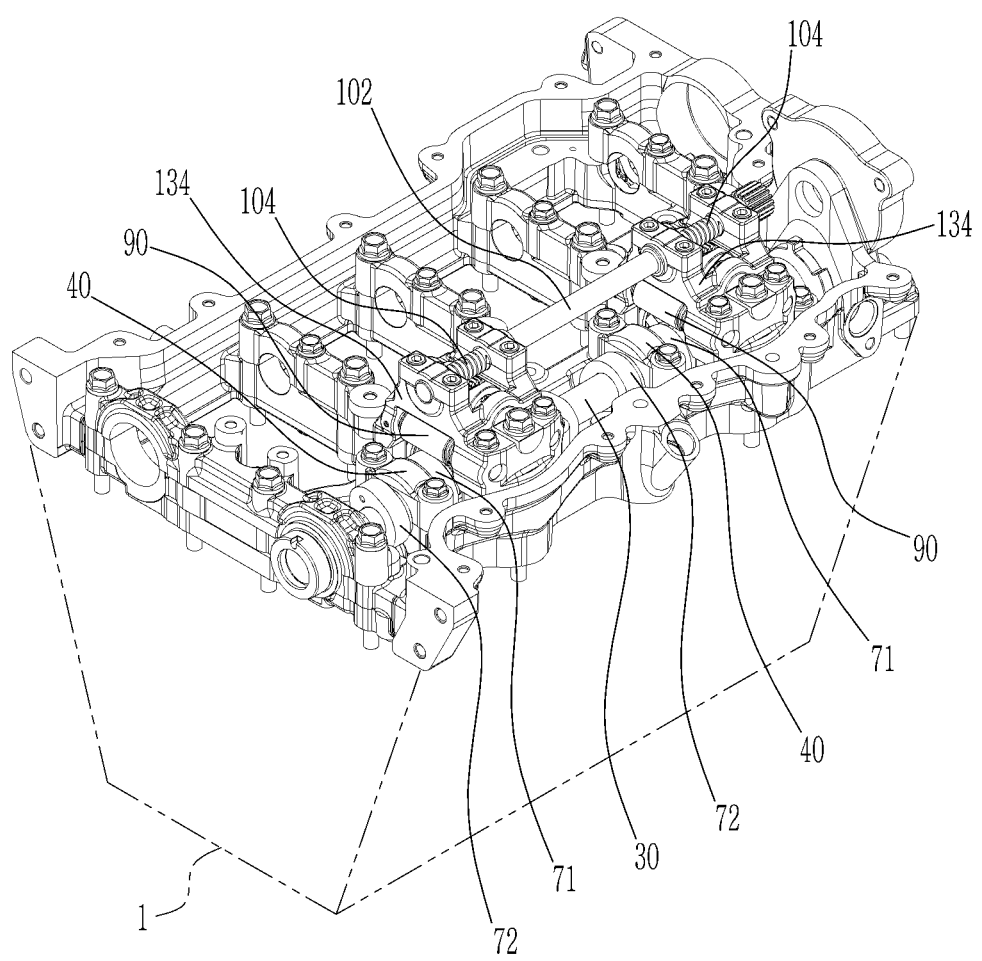
FIG. 1 is a perspective view of an engine provided with a continuous variable valve duration apparatus according to an exemplary embodiment of the present invention.

The following reference symbols can be used in conjunction with the drawings.

| | |
|---|---|
| 1: engine | 30: camshaft |
| 32: camshaft oil hole | 34: camshaft hole |
| 40: cam cap | 50: worm wheel |
| 52: inner screw thread | 54: outer screw thread |
| 60: roller wheel | 62: wheel body |
| 64: wheel head | 66: body oil hole |
| 68: oil groove | 69: communicate hole |
| 70: cam unit | 70a, 70b: first/second cam portion |
| 71, 72: cam | 74: cam slot |
| 76: cam cap connecting portion | 80: inner wheel |
| 82: roller cam | 82a: roller cam body |
| 82b: roller cam head | 82c: protrusion |
| 83: cam slot | 84, 85: first/second inner wheel connecting portion |
| 86: first sliding hole | 88: second sliding hole |
| 90: wheel housing | 92: guide wall |
| 94: moving hole | 96: sliding hole |
| 100: controller | 102: control shaft |
| 104: control worm | 106: control motor |
| 130: guide thread | 132: guide shaft |
| 132a: connecting pin | 132b: connecting hole |
| 134: guide bracket | 135: sliding shaft |
| 135a: sliding shaft hole | 136: bolt |
| 137: insertion hole | 138: moving space |
| 139: worm shaft cap | 140: bearing |
| 150: wheel elastic portion | 152: flat spring |
| 154: flat spring guide | 156: guide coupling portion |
| 158: guide connecting portion | 200: valve |
| 201-204: first -fourth cylinder | |

DETAILED DESCRIPTION OF ILLUSTRATIVE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention.

A part irrelevant to the description will be omitted to clearly describe the present invention, and the same or similar elements will be designated by the same reference numerals throughout the specification.

In the drawings, the thickness of layers, films, panels, regions, etc., are exaggerated for clarity.

Throughout the specification and the claims, unless explicitly described to the contrary, the word "comprise" and variations such as "comprises" or "comprising," will be understood to imply the inclusion of stated elements but not the exclusion of any other elements.

Exemplary embodiments of the present invention will hereinafter be described in detail with reference to the accompanying drawings.

Figure 2:
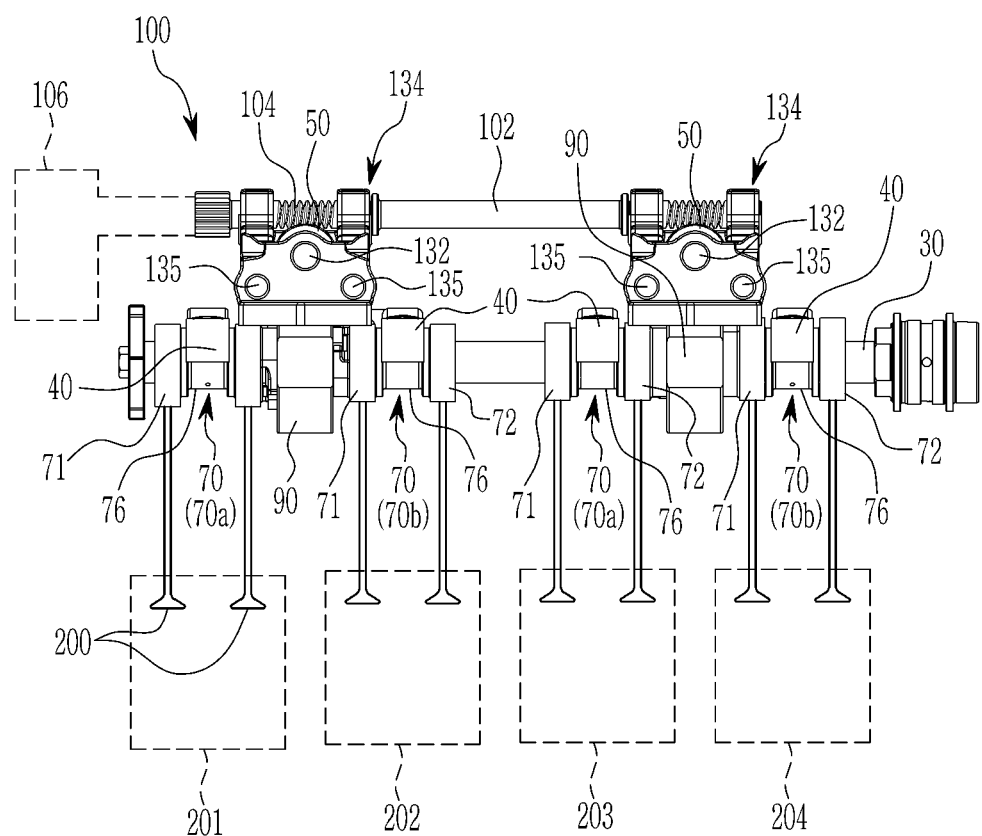
FIG. 2 is a side view of a continuous variable valve duration apparatus according to an exemplary embodiment of the present invention.

FIG. 1 is a perspective view of an engine provided with a continuous variable valve duration apparatus according to an exemplary embodiment of the present invention, and FIG. 2 is a side view of a continuous variable valve duration apparatus according to an exemplary embodiment of the present invention.

Figure 3:
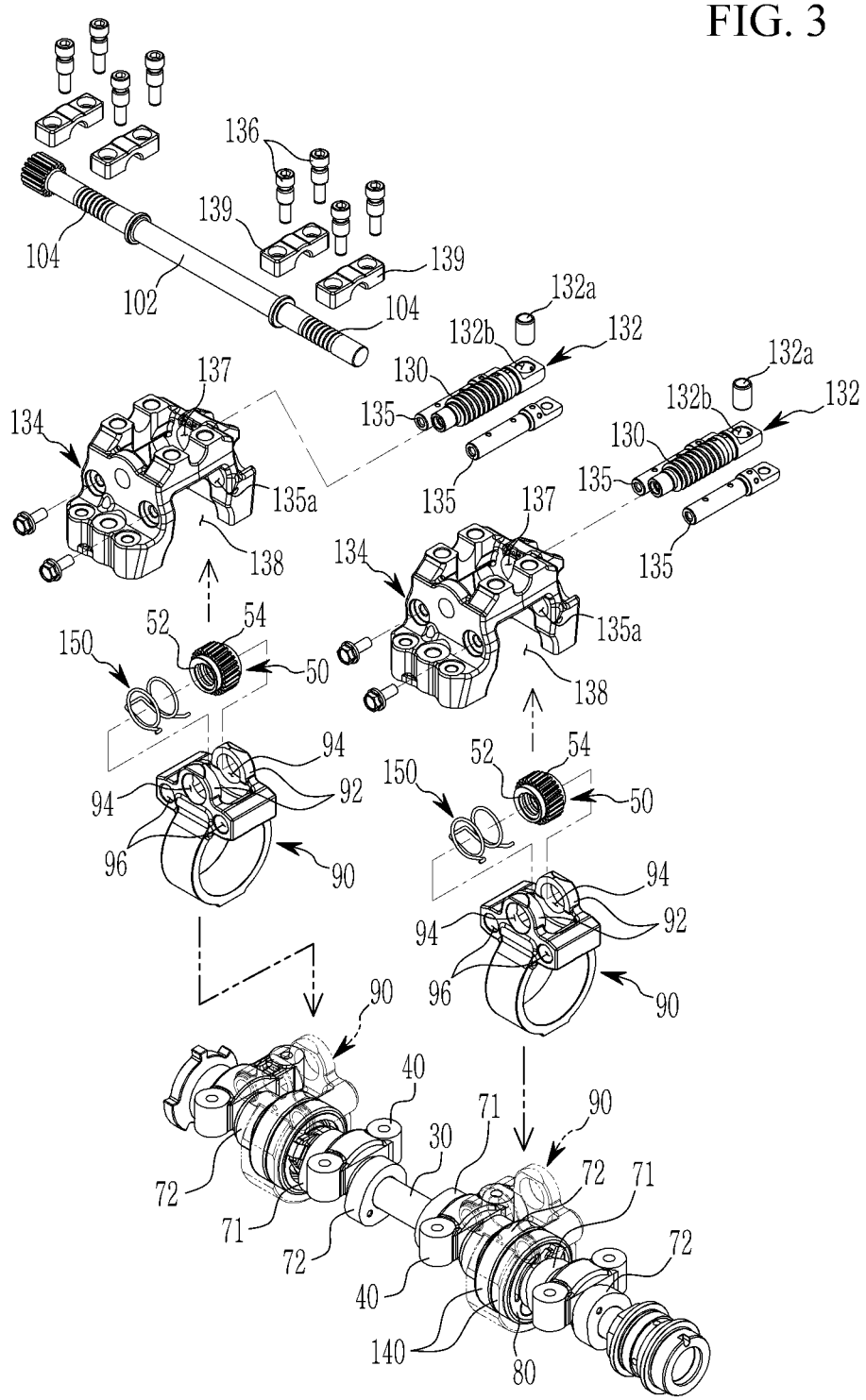
FIG. 3 is an exploded perspective view of a continuous variable valve duration apparatus according to an exemplary embodiment of the present invention.
Figure 4:
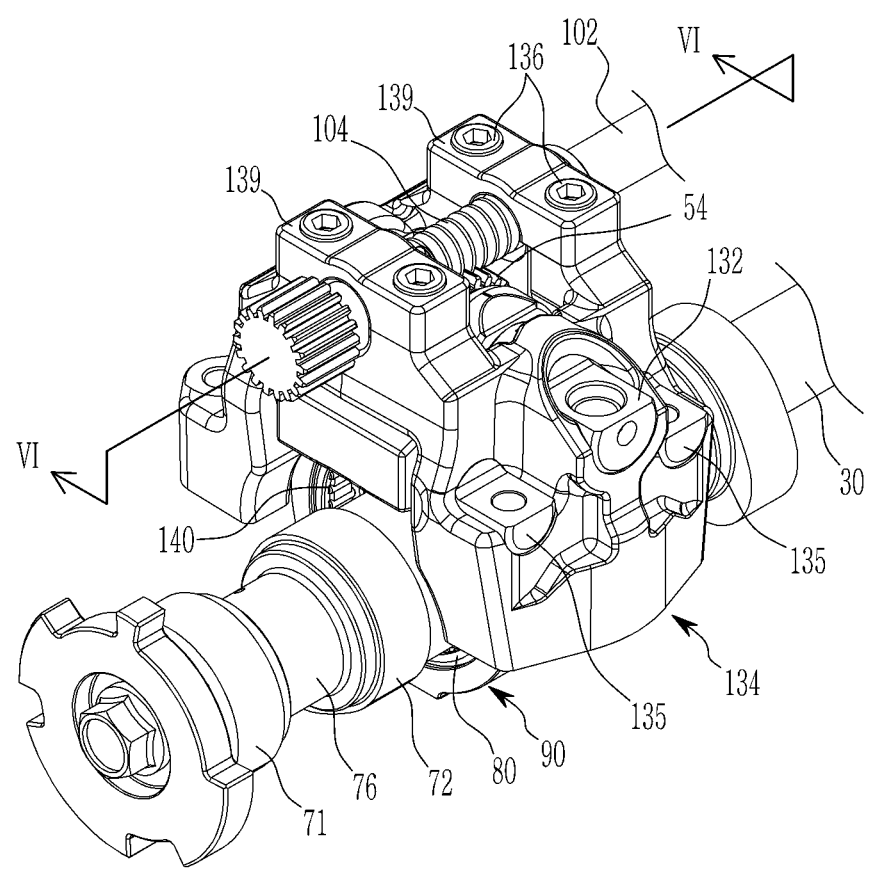
FIG. 4 is a partial perspective view of a continuous variable valve duration apparatus according to an exemplary embodiment of the present invention.

FIG. 3 is an exploded perspective view of a continuous variable valve duration apparatus according to an exemplary embodiment of the present invention, and FIG. 4 is a partial perspective view of a continuous variable valve duration apparatus according to an exemplary embodiment of the present invention.

Figure 5:
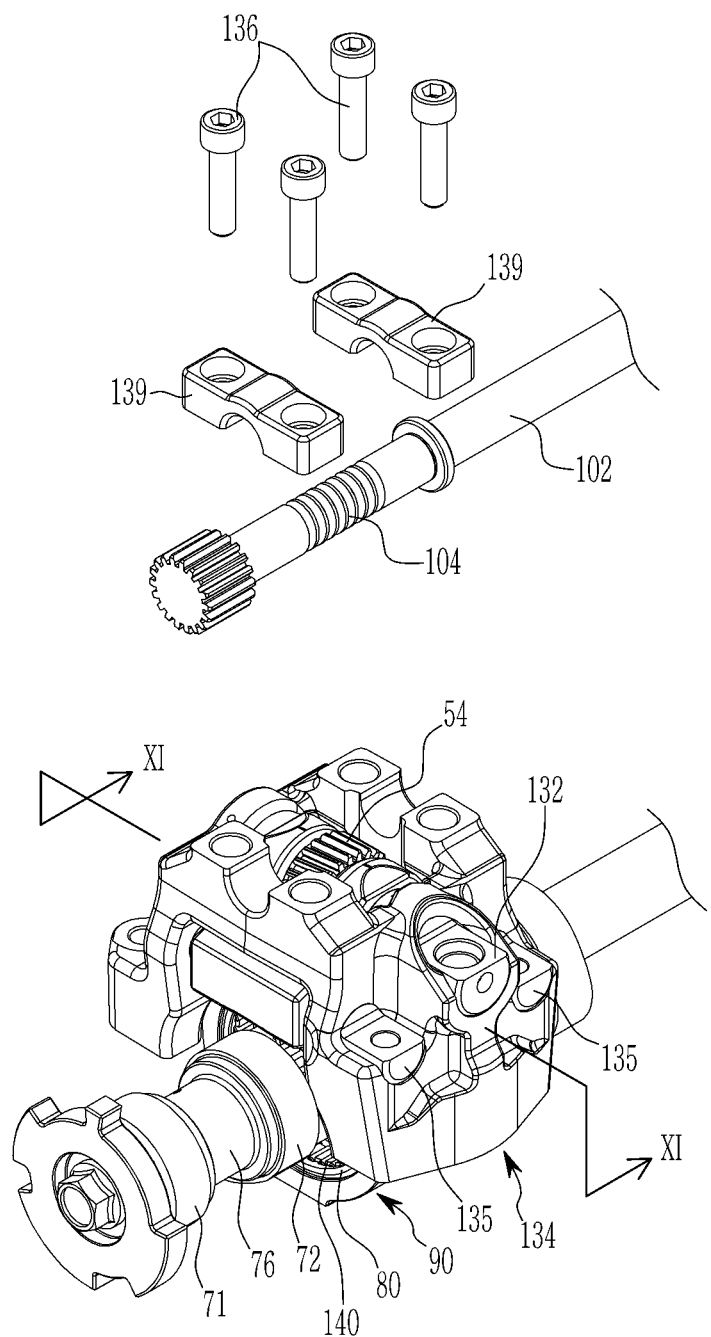
FIG. 5 is a partial exploded perspective view of a continuous variable valve duration apparatus according to an exemplary embodiment of the present invention.
Figure 6:
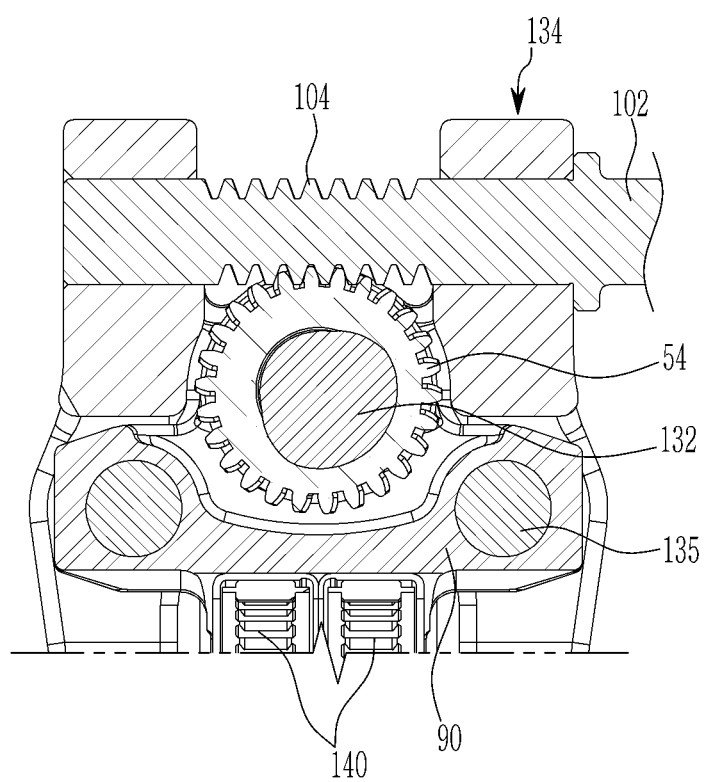
FIG. 6 is a cross-sectional view along line VI-VI of FIG. 4.

FIG. 5 is a partial exploded perspective view of a continuous variable valve duration apparatus according to an exemplary embodiment of the present invention, and FIG. 6 is a cross-sectional view along line VI-VI of FIG. 4.

Referring to FIG. 1 to FIG. 6, an engine 1 according to an exemplary embodiment of the present invention includes a continuous variable valve duration apparatus.

In the drawings, four cylinders 201, 202, 203 and 204 are formed to the engine, but it is not limited thereto.

A continuous variable valve duration apparatus according to an exemplary embodiment of the present invention may include a camshaft 30 and a cam unit 70 on which a cam 71 is formed, the camshaft 30 being inserted into the cam 71. The continuous variable valve duration apparatus may further include a guide shaft 132, on which a guide screw thread 130 is formed, disposed perpendicular to the camshaft 30, and a guide bracket 134 on which the guide shaft 132 is mounted. The continuous variable valve duration apparatus may further include an inner wheel 80 configured to transmit rotation of the camshaft 30 to the cam unit 70, a wheel housing 90 into which the inner wheel 80 is rotatably inserted and movable perpendicular to the camshaft 30, the wheel housing 90 being disposed within the guide bracket 134, and a worm wheel 50. An inner screw thread 52 configured to engage with the guide screw thread 130 is formed inside the worm wheel 50, and an outer screw thread 54 is formed on the outside of the worm wheel 50. The worm wheel 50 is disposed within the wheel housing 90. The continuous variable valve duration apparatus may further include a control shaft 102 on which a control worm 104 configured to engage with the outer screw thread 54 is formed, and a wheel elastic portion 150 (referring to FIG. 9) mounted to the wheel housing 90 to push the worm wheel 50 toward the guide shaft 132 and the control shaft 102.

The camshaft 30 may be an intake camshaft or an exhaust camshaft.

An insertion hole 137 into which the guide shaft 132 is inserted and a moving space 138 within which the wheel housing 90 is movable may be formed in the guide bracket 134.

The continuous variable valve duration apparatus may further include two guide walls 92 protruded from the wheel housing 90, and a moving hole 94 formed in each of the two guide walls 92, the guide shaft 132 being configured to be inserted into the moving holes 94.

The worm wheel 50 may be disposed between the guide walls 92 and may be configured to selectively push one of the two guide walls 92 to move the wheel housing 90.

The continuous variable valve duration apparatus may further include a sliding shaft 135 fixed to the guide bracket 134 through a sliding shaft hole 135c configured for guiding movement of the wheel housing 90, and a sliding hole 96, into which the sliding shaft 135 is inserted, is formed in the wheel housing 90.

The continuous variable valve duration apparatus further includes a worm shaft cap 139 fixed to the guide bracket 134 and configured for supporting the control shaft 102. The worm shaft cap 139 may be fixed to the guide bracket 134 through bolts 136.

A connecting scheme of the guide bracket 134, the wheel housing 90 and the worm wheel 50 may be simple and minimize layout of the continuous variable valve duration apparatus.

A connecting hole 132b is formed in the guide shaft 132 so that the guide shaft 132 can be coupled to the guide bracket 134 through a connecting pin 132a.

Figure 7:
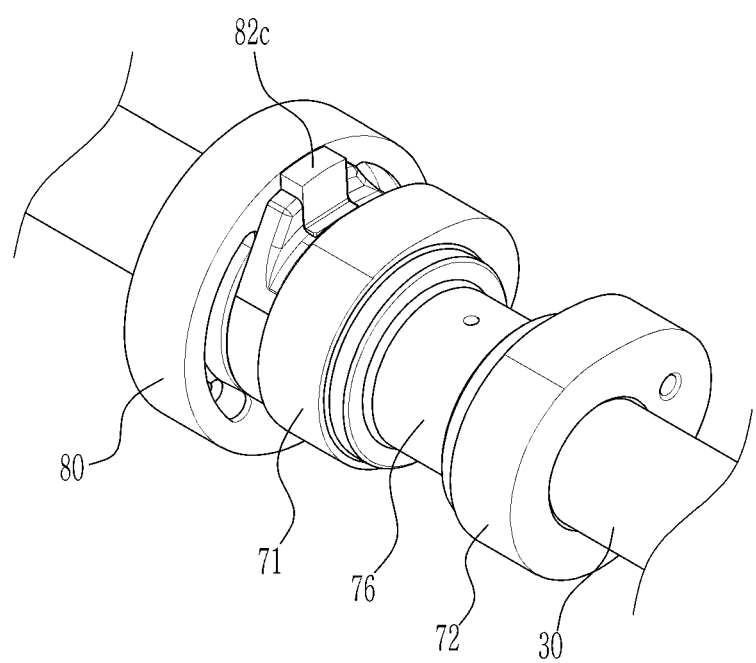
FIG. 7 is a perspective view showing an inner wheel and a cam unit applicable to an exemplary embodiment of the present invention.
Figure 8:
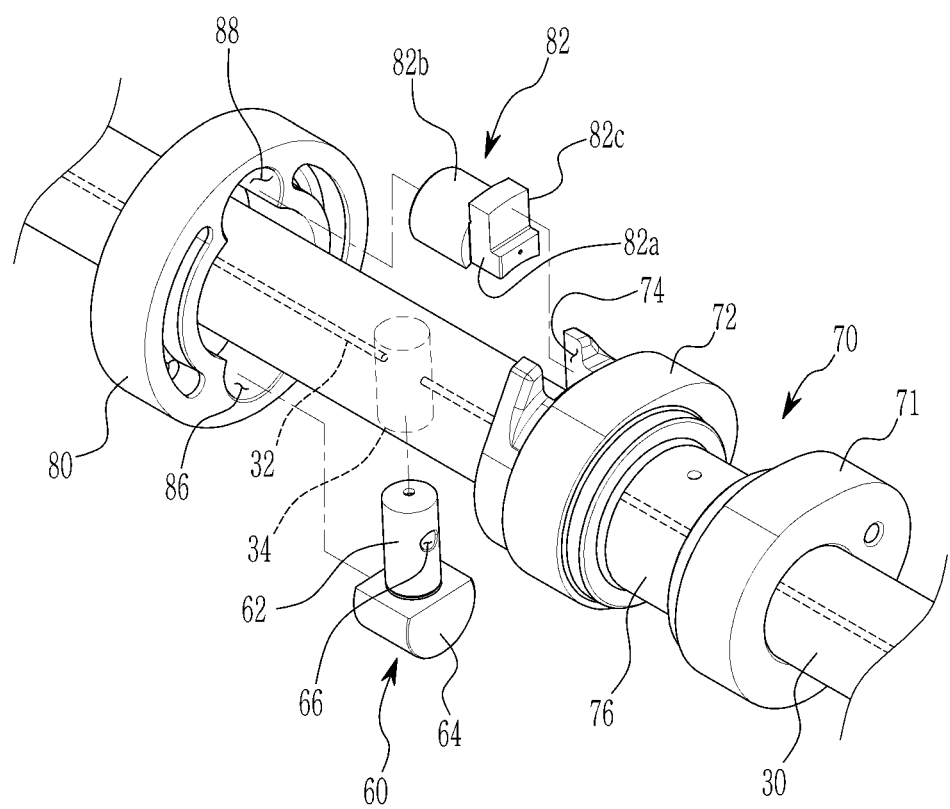
FIG. 8 is an exploded perspective view showing an inner wheel and a cam unit applicable to an exemplary embodiment of the present invention.

FIG. 7 is a perspective view showing an inner wheel and a cam unit applicable to an exemplary embodiment of the present invention, and FIG. 8 is an exploded perspective view showing an inner wheel and a cam unit applicable to an exemplary embodiment of the present invention.

Referring to FIG. 1 to FIG. 8, a first sliding hole 86 and a second sliding hole 88 are formed in the inner wheel 80 and a cam slot 74 is formed in the cam unit 70.

The continuous variable valve duration apparatus further includes a roller wheel 60 connected to the camshaft 30 and rotatably inserted into the first sliding hole 86 and a roller cam 82 slidably inserted into the cam slot 74 and rotatably inserted into the second sliding hole 88.

The roller cam 82 includes a roller cam body 82a slidably inserted into the cam slot 74 and a cam head 82b rotatably inserted into the second sliding hole 88.

A protrusion 82c is formed at the roller cam 82 for preventing the roller cam 82 from being separated from the inner wheel 80 along the longitudinal direction of the camshaft 30.

The roller wheel 60 includes a wheel body 62 slidably connected to the camshaft 30 and a wheel head 64 rotatably inserted into the first sliding hole 86, and the wheel body 62 and the wheel head 64 may be integrally formed.

A camshaft hole 34 is formed in the camshaft 30, the wheel body 62 of the roller wheel 60 is movably inserted into the camshaft hole 34, and the wheel head 64 is rotatably inserted into the first sliding hole 86.

A camshaft oil hole 32 is formed within the camshaft 30 along a longitudinal direction thereof, a body oil hole 66 communicated with the camshaft oil hole 32 is formed in the wheel body 62 of the roller wheel 60, and an oil groove 68 (referring to FIG. 16) communicated with the body oil hole 66 via a communicate hole 69 is formed in the wheel head 64 of the roller wheel 60.

Lubricant supplied to the camshaft oil hole 22 may be supplied to the inner wheel 80 through the body oil hole 66, the communicate hole 69 and the oil groove 68.

Figure 9:
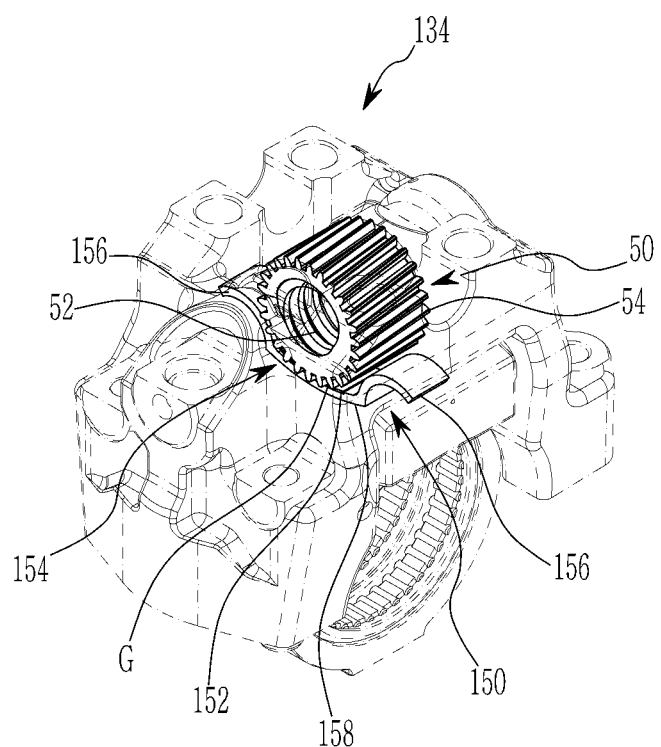
FIG. 9 is a perspective view showing mounting of a wheel elastic portion according to an exemplary embodiment of the present invention.
Figure 10:
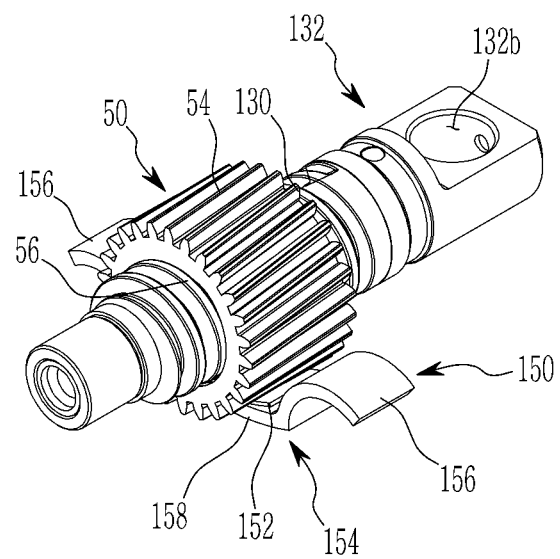
FIG. 10 is a perspective view showing a wheel elastic portion and a worm wheel applicable to an exemplary embodiment of the present invention.

FIG. 9 is a perspective view showing mounting of a wheel elastic portion according to an exemplary embodiment of the present invention, and FIG. 10 is a perspective view showing a wheel elastic portion and a worm wheel applicable to an exemplary embodiment of the present invention.

Figure 11:
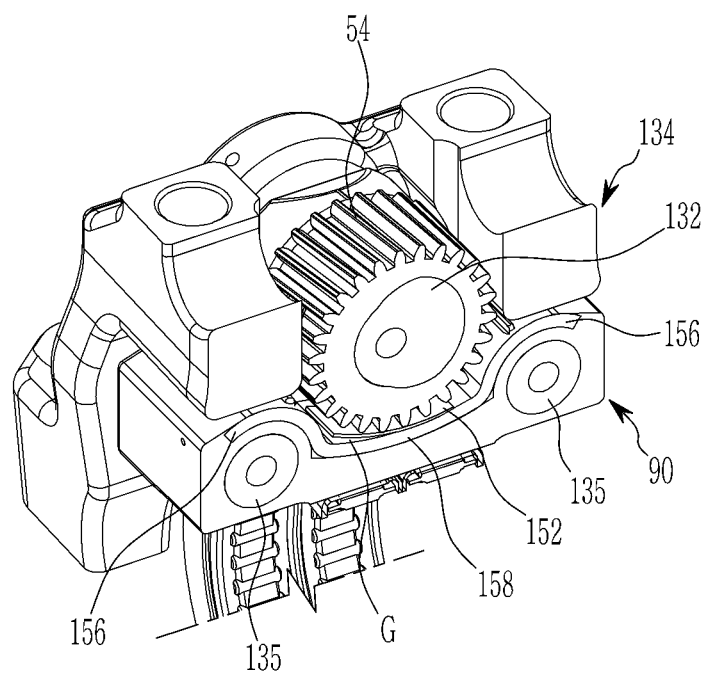
FIG. 11 is a cross-sectional view along line XI-XI of FIG. 5.
Figure 12:
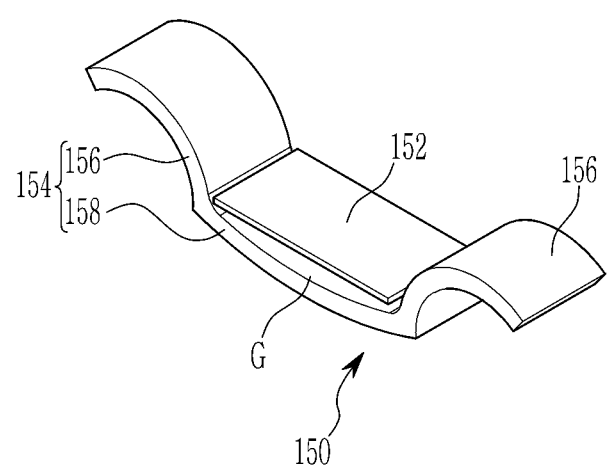
FIG. 12 is a perspective view showing a wheel elastic portion according to an exemplary embodiment of the present invention.

FIG. 11 is a cross-sectional view along line XI-XI of FIG. 5.

Referring to FIG. 9 to FIG. 12, the wheel elastic portion 150 may include a flat spring 152.

The wheel elastic portion 150 may further include a flat spring guide 154 mounted to the wheel housing 90 to connect with the flat spring 152.

The flat spring guide 154 includes guide coupling portions 156 in contact with the wheel housing 90 and a guide connecting portion 158 formed between the guide coupling portions 156, and a gap G is formed between the flat spring 152 and the flat spring guide 154.

Tolerances are required for the operation of each component of a continuous variable valve duration apparatus, but vibration and noise may occur during engine operation due to tolerances among the control worm 104, the worm wheel 50 and the guide screw thread 130.

The flat spring 152 of the wheel elastic portion 150 may push the worm wheel 50 to the guide shaft 132 and the control shaft 102 to suppress vibration and noise generation during engine operation, with or without tolerances.

Figure 13:
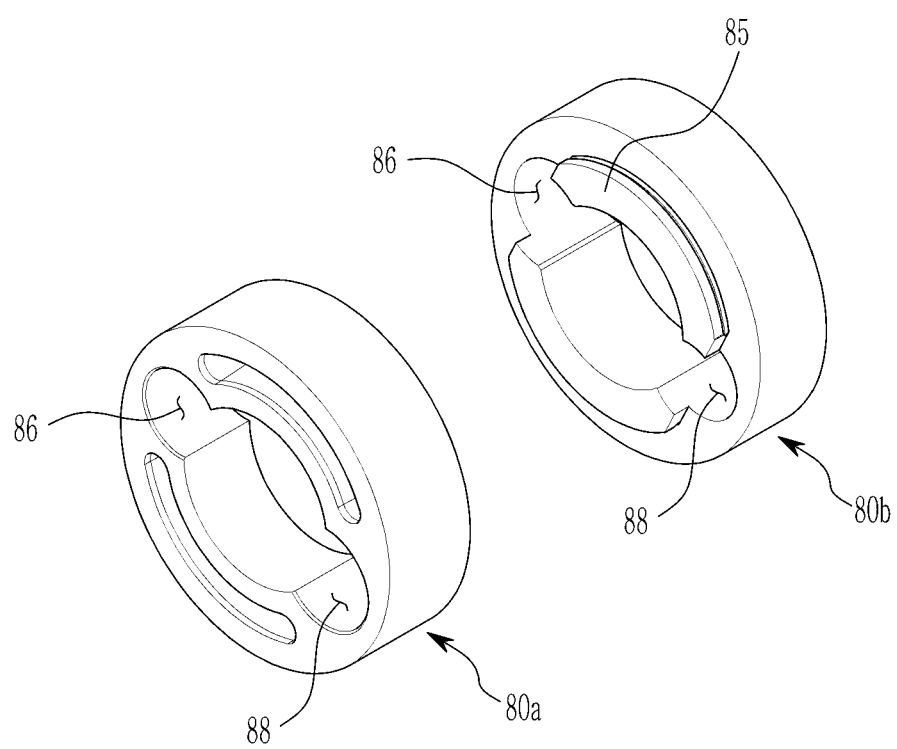
FIG. 13 and FIG. 14 are drawings showing an inner wheel of a continuous variable valve duration apparatus according to an exemplary embodiment of the present invention.
Figure 14:
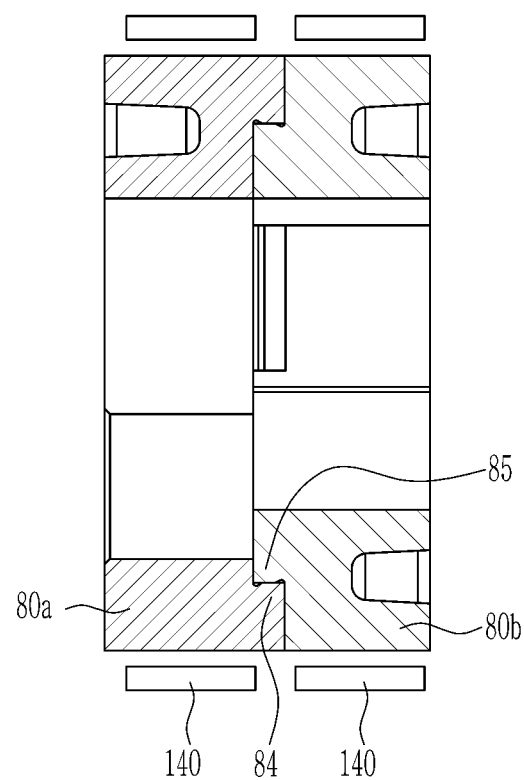

FIG. 13 and FIG. 14 are drawings showing an inner wheel of a continuous variable valve duration apparatus according to an exemplary embodiment of the present invention.

Referring to FIG. 2, FIG. 13 and FIG. 14, the cam unit 70 includes a first cam portion 70a and a second cam portion 70b which are disposed corresponding to a cylinder and an adjacent cylinder respectively, for example the first cylinder 201 and the adjacent second cylinder 202, and the inner wheel 80 includes a first inner wheel 80a and a second inner wheel 80b transmitting rotation of the camshaft 30 to the first cam portion 70a and the second cam portion 70b respectively.

The continuous variable valve duration apparatus further includes a bearing 140 disposed within the wheel housing 90 for supporting the first inner wheel 80a and the second inner wheel 80b.

The bearing 140 may be a needle bearing, the first and the second inner wheels 80a and 80b are disposed within one wheel housing 90, and the bearing 140 may rotatably support the first and the second inner wheels 80a and 80b.

Since the first and the second inner wheels 80a and 80b may be disposed within one wheel housing 90, element numbers may be reduced, so that productivity and manufacturing economy may be enhanced.

The first inner wheel 80a and the second inner wheel 80b within the wheel housing 90 may be connected rotatable to each other. For example, a first inner wheel connecting portion 84 and a second inner wheel connecting portion 85 are formed to the first inner wheel 80a and the second inner wheel 80b respectively, and the first inner wheel connecting portion 84 and the second inner wheel connecting portion 85 are connected to each other.

In the drawing, the first inner wheel connecting portion 84 and the second inner wheel connecting portion 85 are formed as convex and concave, but it is not limited thereto. The first inner wheel 80a and the second inner wheel 80b are connected rotatable to each other with variable connecting structures.

In the case that the first inner wheel 80a and the second inner wheel 80b are connected, looseness or vibration due to manufacturing tolerances of the bearing, the inner wheel, the lifter and so on may be reduced.

Two cams 71 and 72 may be formed on the first and the second cam portions 70a and 70b as a pair and a cam cap connecting portion 76 is formed between the paired cams 71 and 72 of each of the first and second cam portions 70a and 70b.

The cams 71 and 72 rotate and open the valve 200.

The continuously variable valve duration apparatus further includes a cam cap 40 on which a cam supporting portion 46 configured to rotatably support the cam cap connecting portion 76 is formed.

Figure 15A:
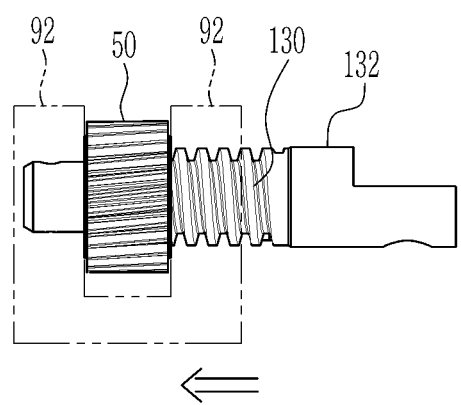
FIG. 15A and FIG. 15B are drawings showing an operation of worm wheel and a wheel housing according to an exemplary embodiment of the present invention.
Figure 15B:
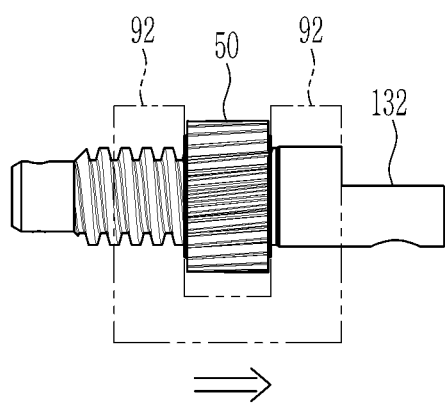
Figure 16:
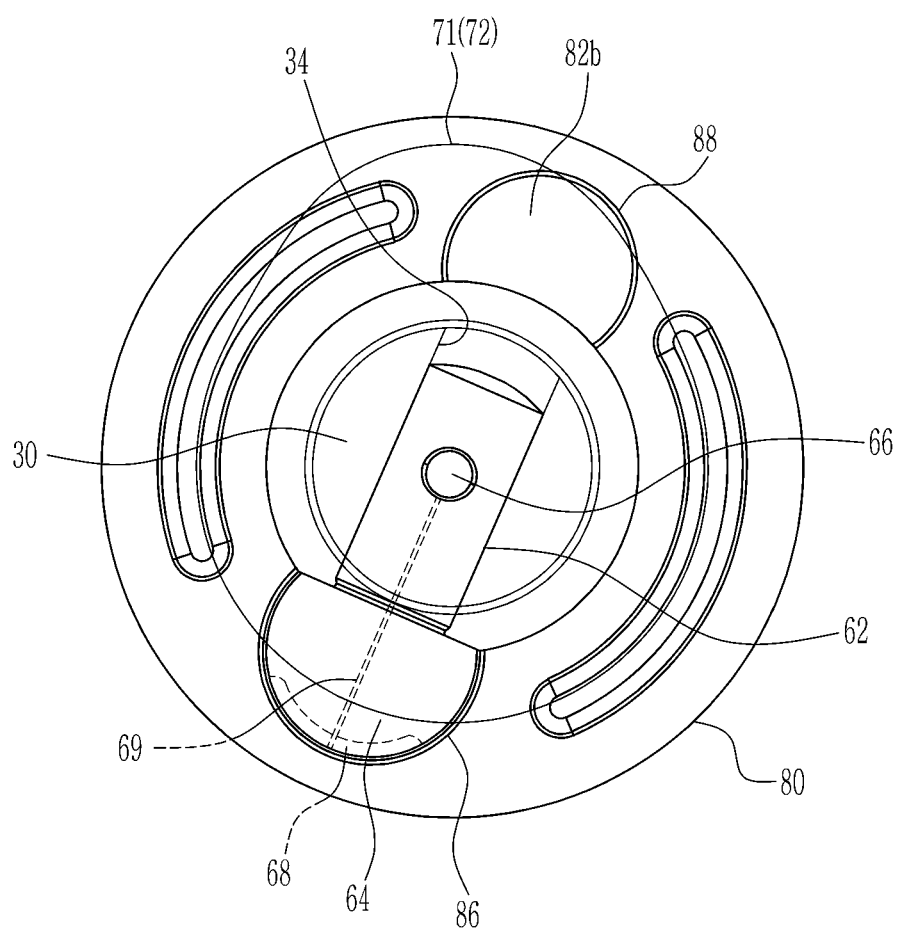
FIG. 16 to FIG. 18 are drawings showing operations of an inner wheel of a continuous variable valve duration apparatus according to an exemplary embodiment of the present invention.
Figure 17:
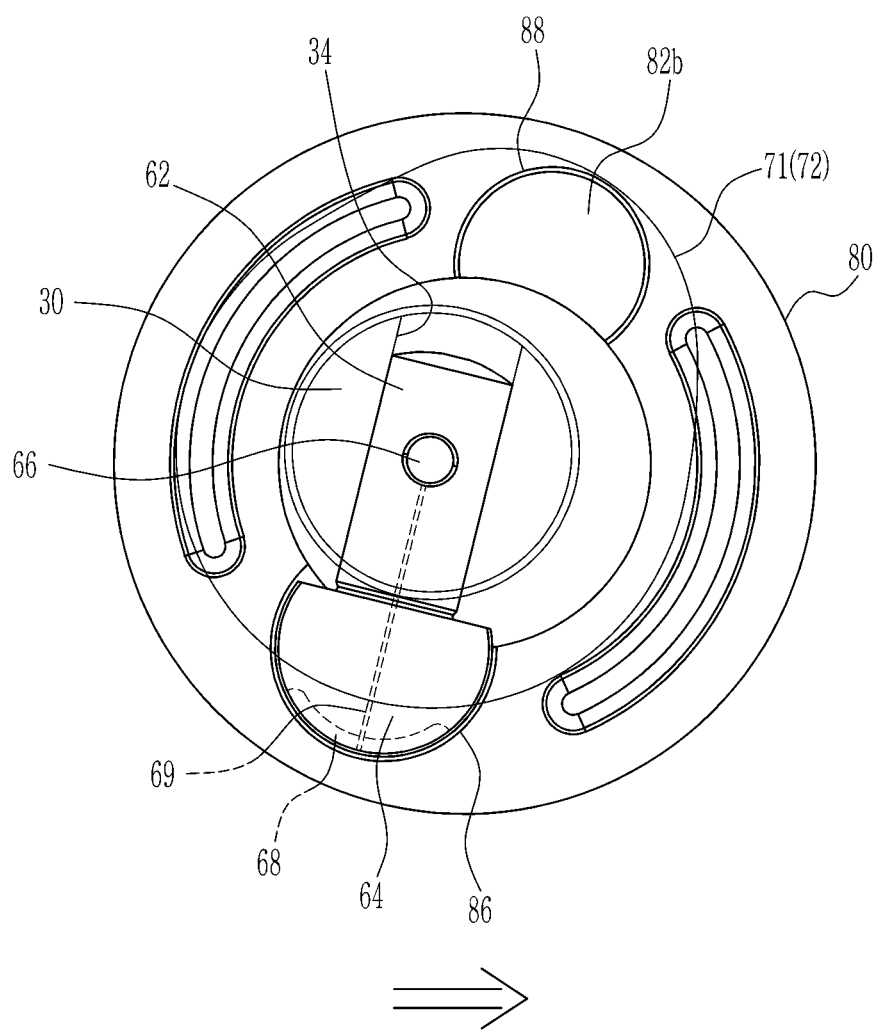
Figure 18:
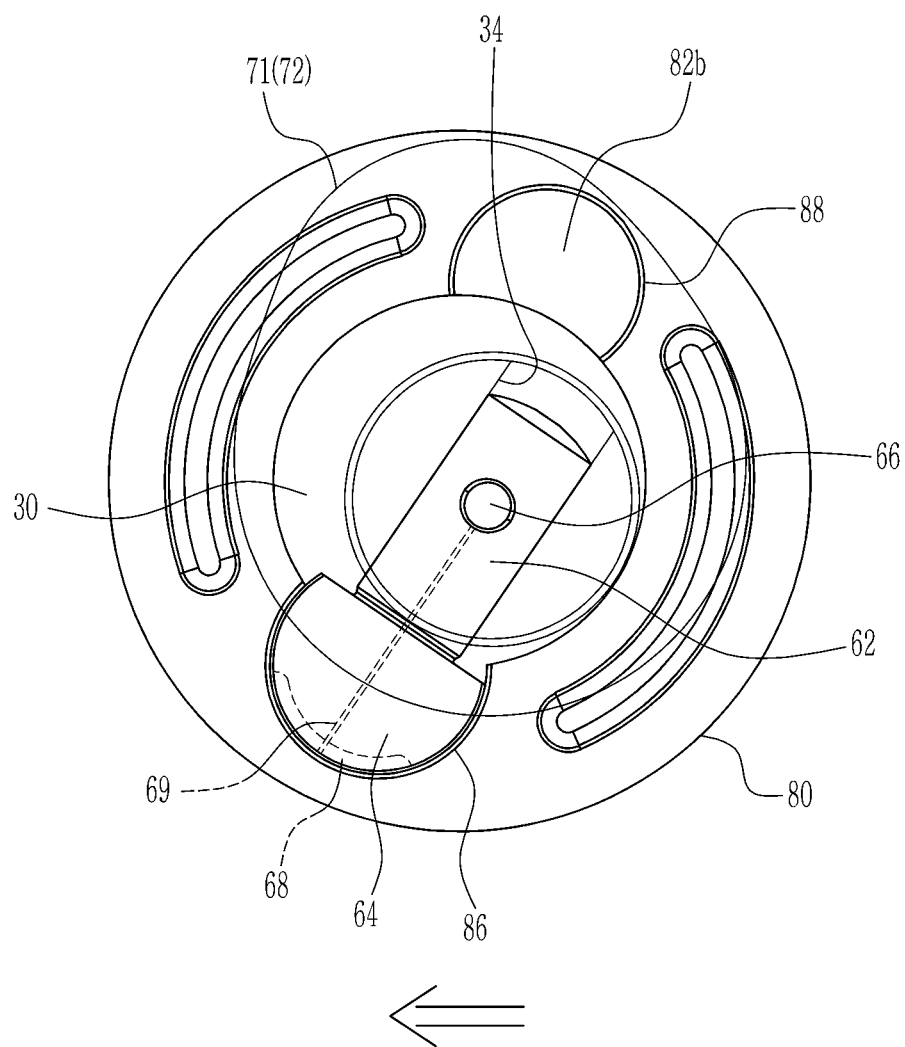

FIG. 15A and FIG. 15B are drawings showing an operation of a worm wheel and a wheel housing according to an exemplary embodiment of the present invention, and FIG. 16 to FIG. 18 are drawings showing operations of an inner wheel of a continuous variable valve duration apparatus according to an exemplary embodiment of the present invention.

As shown in FIG. 16, when rotation centers of the camshaft 30 and the cam unit 70 are coincident, the cams 71 and 72 rotate with the same phase angle of the camshaft 30.

According to engine operation states, an ECU (engine control unit or electric control unit) transmits control signals to the control portion 100, and then the control motor 106 rotates the control shaft 102.

Then, the control worm 104 engaged with the outer screw thread 54 rotates the worm wheel 50. And since the inner screw thread 52 formed to the worm wheel 50 is engaged with the guide screw thread 130, the worm wheel 50 moves along the guide screw thread 130.

As shown in FIG. 15A, FIG. 15B, FIG. 17 and FIG. 18, the worm wheel 50 moves along the guide shaft 132 according to the rotation of the control shaft 102 and the worm wheel 50 selectively pushes one of the two guide walls 92, and thus a relative position of the wheel housing 90 with respect to the camshaft 30 is changed.

When the relative position of the wheel housing 90 with respect to the camshaft 30 is changed, the relative rotation speed of the cams 71 and 72 with respect to the rotation speed of the camshaft 30 is changed.

While the roller wheel 60 is rotated together with the camshaft 30, the wheel body 62 is slidable within the camshaft hole 34, the wheel head 64 is rotatable within the first sliding hole 86, and the roller cam 82 is rotatably within the second sliding hole 88 and slidable within the cam slot 74. Thus, the relative rotation speed of the cams 71 and 72 with respect to the rotation speed of the camshaft 30 is changed.

Figure 19A:
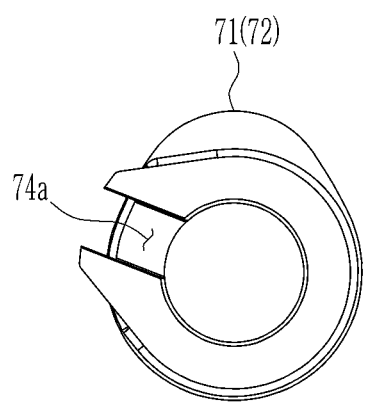
FIG. 19A and FIG. 19B are drawings showing a cam slot of a continuous variable valve duration apparatus according to an exemplary embodiment of the present invention.
Figure 19B:
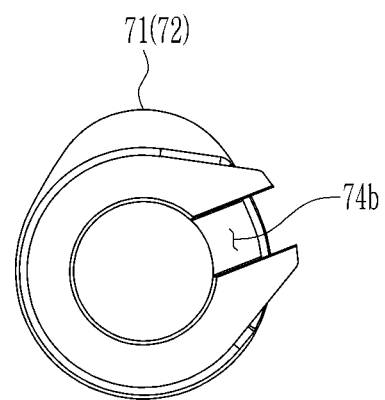
Figure 20A:
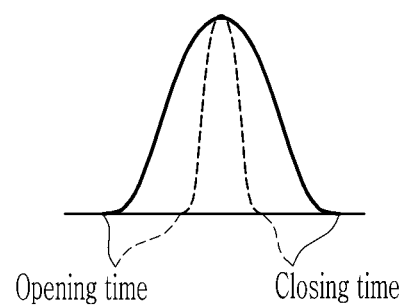
FIG. 20A, FIG. 20B and FIG. 20C are graphs showing valve profiles of a continuous variable valve duration apparatus according to an exemplary embodiment of the present invention.
Figure 20B:
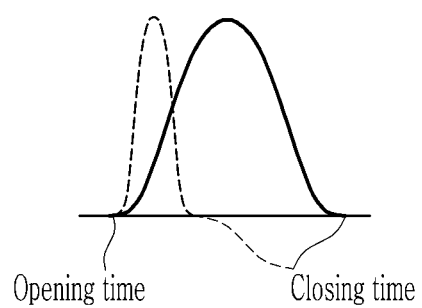
Figure 20C:
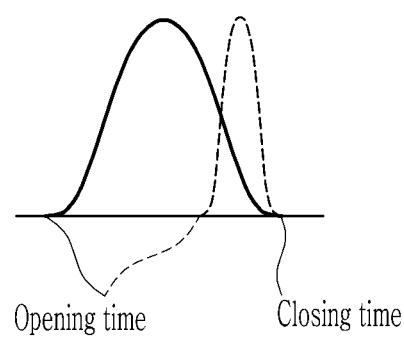

FIG. 19A and FIG. 19B are drawings showing a cam slot of a continuous variable valve duration apparatus according to an exemplary embodiment of the present invention, and FIG. 20A, FIG. 20B and FIG. 20C are graphs showing valve profiles of a continuous variable valve duration apparatus according to an exemplary embodiment of the present invention.

As shown in FIG. 19A and FIG. 19B, the cam slot 74 may be formed more retarded than a position of the cam 71 or 72 (referring to FIG. 19A), the cam slot 74 may be formed more advanced than a position of the cam 71 or 72 (referring to FIG. 19B), or the cam slot 74 may be formed with the same phase of the cam 71 or 72. With the above scheme, various valve profiles may be achieved.

Although maximum lift of the valve 200 is constant, rotation speed of the cam 71 and 72 with respect to the rotation speed of the camshaft 30 is changed according to relative positions of the wheel housing 90 so that closing and opening time of the valve 200 is changed. That is, duration of the valve 200 is changed.

According to the relative position of the cam slot 74, the mounting angle of the valve 200 and so on, opening and closing time of the valve 200 may be simultaneously changed as shown in FIG. 20A.

While opening time of the valve 200 is constant, closing time of the valve 200 may be retarded or advanced as shown FIG. 20B.

While closing time of the valve 200 is constant, opening time of the valve 200 may be retarded or advanced as shown FIG. 20C.

As described above, a continuous variable valve duration apparatus according to an exemplary embodiment of the present invention may achieve various valve durations with a simple construction.

The continuous variable valve duration apparatus according to an exemplary embodiment of the present invention may be reduced in size and thus the entire height of a valve train may be reduced.

Since the continuous variable valve duration apparatus may be applied to an existing engine without excessive modification, productivity may be enhanced and production cost may be reduced.

The continuous variable valve duration apparatus according to an exemplary embodiment of the present invention can reduce noise and vibration by applying a wheel elastic portion even if there is a production error in the parts.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A continuous variable valve duration apparatus comprising:
    a cam unit;
    a cam formed on the cam unit;
    a camshaft inserted into the cam;
    a guide bracket;
    a guide shaft mounted on the guide bracket and disposed perpendicular to the camshaft, wherein a guide screw thread is formed on the guide shaft;
    a wheel housing disposed within the guide bracket;
    an inner wheel rotatably inserted into the wheel housing and movable perpendicular to the camshaft, the inner wheel configured to transmit rotation of the camshaft to the cam unit;
    a worm wheel disposed within the wheel housing, wherein an inner screw thread configured to engage with the guide screw thread is formed inside the worm wheel and an outer screw thread is formed on the worm wheel;
    a control shaft;
    a control worm formed on the control shaft and configured to engage with the outer screw thread; and
    a wheel elastic portion mounted to the wheel housing and configured to push the worm wheel toward the guide shaft and the control shaft.

2. The apparatus of claim 1, wherein the wheel elastic portion includes a flat spring.

3. The apparatus of claim 2, wherein the wheel elastic portion further includes a flat spring guide mounted to the wheel housing to connect with the flat spring.

4. The apparatus of claim 3, wherein the flat spring guide includes:
    guide coupling portions in contact with the wheel housing; and
    a guide connecting portion formed between the guide coupling portions and forming a gap between the flat spring guide and the flat spring.

5. The apparatus of claim 1, wherein an insertion hole into which the guide shaft is inserted and a moving space within which the wheel housing is movable are formed in the guide bracket.

6. The apparatus of claim 1, further comprising:
    two guide walls protruded from the wheel housing; and
    a moving hole formed in each of the two guide walls, wherein the guide shaft is configured to be inserted into the moving holes.

7. The apparatus of claim 6, wherein the worm wheel is disposed between the guide walls and is configured to selectively push one of the two guide walls to move the wheel housing.

8. The apparatus of claim 1, further comprising:
    a sliding shaft fixed to the guide bracket, the sliding shaft configured to guide movement of the wheel housing; and
    a sliding hole formed in the wheel housing, wherein the sliding shaft is configured to be inserted into the wheel housing.

9. The apparatus of claim 1, further comprising a worm shaft cap fixed to the guide bracket and configured to support the control shaft.

10. The apparatus of claim 1, further comprising:
    a first sliding hole and a second sliding hole formed in the inner wheel;
    a cam slot formed in the cam unit;
    a roller wheel connected to the camshaft and rotatably inserted into the first sliding hole; and
    a roller cam slidably inserted into the cam slot and rotatably inserted into the second sliding hole.

11. The apparatus of claim 10, wherein the roller cam comprises:
    a roller cam body slidably inserted into the cam slot;
    a cam head rotatably inserted into the second sliding hole; and
    a protrusion configured to inhibit the roller cam from being removed.

12. The apparatus of claim 10, wherein the roller wheel comprises:
    a wheel body slidably connected to the camshaft; and
    a wheel head rotatably inserted into the first sliding hole.

13. The apparatus of claim 12, further comprising:
    a camshaft oil hole formed within the camshaft along a longitudinal direction thereof;
    a body oil hole formed in the wheel body of the roller wheel and configured to communicate with the camshaft oil hole; and
    an oil groove formed in the wheel head of the roller wheel and configured to communicate with the body oil hole.

14. The apparatus of claim 1, wherein:
    the cam unit includes a first cam portion and a second cam portion which are disposed corresponding to a cylinder and an adjacent cylinder respectively; and
    the inner wheel includes a first inner wheel and a second inner wheel configured to transmit the rotation of the camshaft to the first cam portion and the second cam portion respectively.

15. The apparatus of claim 14, wherein the first inner wheel and the second inner wheel are rotatably connected to each other.

16. The apparatus of claim 14, further comprising a bearing disposed within the wheel housing and configured to support the first inner wheel and the second inner wheel.

17. The apparatus of claim 14, further comprising:
two cams formed in the first cam portion and the second cam portion respectively;
a cam connecting portion formed between the two cams; and
a cam cap on which a cam supporting portion configured to support the cam connecting portion is formed.

18. An engine comprising:
a continuous variable valve duration apparatus, the apparatus comprising:
  a cam unit;
  a cam formed on the cam unit;
  a camshaft inserted into the cam;
  a guide bracket;
  a guide shaft mounted on the guide bracket and disposed perpendicular to the camshaft, wherein a guide screw thread is formed on the guide shaft;
  a wheel housing disposed within the guide bracket;
  an inner wheel rotatably inserted into the wheel housing and movable perpendicular to the camshaft, the inner wheel configured to transmit rotation of the camshaft to the cam unit;
  a worm wheel disposed within the wheel housing, wherein an inner screw thread configured to engage with the guide screw thread is formed inside the worm wheel and an outer screw thread is formed on the worm wheel;
  a control shaft;
  a control worm formed on the control shaft and configured to engage with the outer screw thread; and
  a wheel elastic portion mounted to the wheel housing and configured to push the worm wheel toward the guide shaft and the control shaft.

19. A continuous variable valve duration apparatus comprising:
  a cam on a cam unit;
  a camshaft inserted into the cam;
  a guide bracket;
  a guide shaft mounted on the guide bracket and having a guide screw thread on an outer surface of the guide shaft;
  a wheel housing disposed within the guide bracket;
  a sliding shaft fixed to the guide bracket, the sliding shaft configured to guide movement of the wheel housing;
  an inner wheel rotatably inserted into the wheel housing and movable perpendicular to the camshaft, the inner wheel configured to transmit rotation of the camshaft to the cam unit;
  a worm wheel disposed within the wheel housing, wherein an inner screw thread configured to engage with the guide screw thread is formed inside the worm wheel and an outer screw thread is formed on the worm wheel;
  a control shaft;
  a control worm formed on the control shaft and configured to engage with the outer screw thread; and
  a wheel elastic portion mounted to the wheel housing and configured to push the worm wheel toward the guide shaft and the control shaft, the wheel elastic portion including a flat spring and a flat spring guide, the flat spring guide including guide coupling portions and a guide connecting portion formed between the guide coupling portions, wherein a gap is formed between the flat spring guide and the flat spring.

20. The apparatus of claim 19, further comprising:
a first sliding hole and a second sliding hole formed in the inner wheel;
a cam slot formed in the cam unit;
a roller wheel connected to the camshaft and rotatably inserted into the first sliding hole, the roller wheel comprising a wheel body slidably connected to the camshaft, and a wheel head rotatably inserted into the first sliding hole;
a roller cam slidably inserted into the cam slot and rotatably inserted into the second sliding hole, wherein the roller cam comprises a roller cam body slidably inserted into the cam slot, a cam head rotatably inserted into the second sliding hole, and a protrusion configured to inhibit the roller cam from being removed;
a camshaft oil hole formed within the camshaft along a longitudinal direction thereof;
a body oil hole formed in the wheel body of the roller wheel and configured to communicate with the camshaft oil hole; and
an oil groove formed in the wheel head of the roller wheel and configured to communicate with the body oil hole.

* * * * *